United States Patent
Tsuchiya

(10) Patent No.: US 8,089,644 B2
(45) Date of Patent: Jan. 3, 2012

(54) IMAGE-PROCESSING DEVICE, RECORDING MEDIUM, AND METHOD

(75) Inventor: Kentaro Tsuchiya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 925 days.

(21) Appl. No.: 12/051,308

(22) Filed: Mar. 19, 2008

(65) Prior Publication Data

US 2009/0073482 A1    Mar. 19, 2009

(30) Foreign Application Priority Data

Sep. 18, 2007 (JP) ................... 2007-241239
Sep. 27, 2007 (JP) ................... 2007-252150

(51) Int. Cl.
*G06F 15/00* (2006.01)
*G06K 1/00* (2006.01)
*G06K 15/00* (2006.01)
*G06F 3/12* (2006.01)

(52) U.S. Cl. ................... 358/1.14; 358/1.13
(58) Field of Classification Search ............. None
See application file for complete search history.

(56) References Cited

U.S. PATENT DOCUMENTS

| | | | | |
|---|---|---|---|---|
| 6,631,007 | B1 * | 10/2003 | Buis et al. ........... | 358/1.13 |
| 2002/0012129 | A1 | 1/2002 | Amemiya | |
| 2006/0139690 | A1 * | 6/2006 | Yagita ............ | 358/1.15 |
| 2007/0212143 | A1 | 9/2007 | Ohara | |
| 2007/0291295 | A1 * | 12/2007 | Fukuda ............ | 358/1.13 |

FOREIGN PATENT DOCUMENTS

| | | |
|---|---|---|
| JP | 9169141 | 6/1997 |
| JP | 9254503 | 9/1997 |
| JP | 10320139 | 12/1998 |
| JP | 2000001028 | 1/2000 |
| JP | 2001166898 | 6/2001 |
| JP | 2001260494 | 9/2001 |
| JP | 2007233820 | 9/2007 |

OTHER PUBLICATIONS

Notice of Grounds for Rejection corresponding to Japanese Application No. 2007/252150 with the English translation, issued on Dec. 15, 2009.

* cited by examiner

*Primary Examiner* — Douglas Tran
(74) *Attorney, Agent, or Firm* — Gesmer Updegrove LLP

(57) ABSTRACT

There is provided an image-processing device having a receiving unit that receives first variable print data including a plurality of records and designation information designating a rendering program; an image generation unit that performs the image generation process in which the rendering program is executed with regard to the plurality of records included in the first variable print data to generate output images corresponding to each of the plurality of records, wherein when an error occurs because of a first record of the plurality of records during generation of an output image corresponding to the first record, the image generation unit continues the image generation process by changing a record to be processed from the first record to a record which is to be processed later than the first record; and a variable print data generation unit that generates second variable print data including the first record.

8 Claims, 11 Drawing Sheets

```
(layout01) SETLAYOUT
ID, NAME, IMG
001, John Smith, 001.tif
002, James Johnson, 002.tif
...
100, Jane Williams, 100.tif
```

FIG. 2

```
(form01.tif) SETFORM
72 144 MOVETO
NAME show "Dear Mr/Ms." SHOW
IMG IMAGEDRAW
...
```

FIG. 3

```
<print_log  job_name="job01"  job_id="xxx"  date="2007/8/8
18:17:00">
  <errors>
    <error id="1" rec_number="2" err_code="xxx">
    The  image  "002.tif"  is  corrupted,  or  in  an  invalid
format.
    </error>
  </errors>
</print_log>
```

FIG. 5

```
(layout01) SETLAYOUT
ID, NAME, IMG
002, James Johnson , 002.tif
```

FIG. 6

IMAGE-PROCESSING DEVICE, RECORDING MEDIUM, AND METHOD

CROSS-REFERENCE TO RELATED APPLICATIONS

This application is based on and claims priority under 35 USC 119 from Japanese Patent Applications Nos. 2007-241239 filed on Sep. 18, 2007 and 2007-252150 filed on Sep. 27, 2007.

BACKGROUND

1. Technical Field

The present invention relates to an image-processing device, a recording medium, and a method.

2. Related Art

There are known variable data printing techniques to generate, in association with a database, output images whose contents are replaced for each target to produce prints based on these generated images. Variable data printing is also called, for example, variable printing. In variable data printing as used in recent years, it is possible not only to replace simple character strings, such as destination addresses, but also to replace graphs or other complex images in accordance with records in the database. Output images for use in variable data printing are obtained by applying individual records to common layout data and thereby generating images corresponding to these respective records.

During the generation of output images, when an image-processing device cannot access software resources (information resources) such as an image, a form (format data), a font, or a custom font which is to be used, or when data for such software resources are corrupted, an error occurs because an output image cannot be generated. Also, an error occurs in cases, for example, where a mandatory field in a record is empty or contains an invalid value, or where the number of fields in a record is incorrect.

In ordinary printing, when an error occurs during generation of an output image for one job (in other words, one piece of print data input from a host computer or a client computer, or a printing process for such one piece of print data), it is common to discontinue the generation of an output image. Actions which may be taken when the generation of an output image is discontinued include, for example, printing an error sheet indicating that an error has occurred, or printing an output image generated before the error occurred.

SUMMARY

According to an aspect of the invention, there is provided an image-processing device comprising a receiving unit that receives first variable print data including a plurality of records and designation information designating a rendering program to be executed in an image generation process with regard to the first variable print data; an image generation unit that performs the image generation process in which the rendering program is executed with regard to the plurality of records included in the first variable print data to generate output images corresponding to each of the plurality of records, wherein when an error occurs because of a first record of the plurality of records during generation of an output image corresponding to the first record, the image generation unit continues the image generation process by changing a record to be processed from the first record to a record which is to be processed later than the first record; and a variable print data generation unit that generates second variable print data including the first record and the designation information.

BRIEF DESCRIPTION OF THE DRAWINGS

An exemplary embodiment of the present invention will be described in detail by reference to the following figures, wherein:

FIG. 2 illustrates an example of data content of variable print data;

FIG. 3 illustrates an example of content of a layout program;

FIG. 5 illustrates an example of data content of an error log;

FIG. 6 illustrates an example of variable print data generated in order to reprint a record in which an error has occurred;

DETAILED DESCRIPTION

An image-processing device according to an exemplary embodiment of the present invention comprises a receiving unit that receives first variable print data including a plurality of records and designation information designating a rendering program to be executed in an image generation process with regard to the first variable print data; an image generation unit that performs the image generation process in which the rendering program is executed with regard to the plurality of records included in the first variable print data to generate output images corresponding to each of the plurality of records, wherein when an error occurs because of a first record of the plurality of records during generation of an output image corresponding to the first record, the image generation unit continues the image generation process by changing a record to be processed from the first record to a record which is to be processed later than the first record; and a variable print data generation unit that generates second variable print data including the first record and the designation information.

As described above, according to the present exemplary embodiment, when an error has occurred because of a record, there are generated second variable print data, which include a record for which the error has occurred during generation of an output image corresponding to the record and designation information. To generate such data, a record may be stored when an error is detected during the processing of that record, and the thus-stored record may be retrieved later to be combined with the designation information. Alternatively, instead of storing the record itself for which the error has occurred, identification information identifying the record may be stored, and, later, by using such stored identification information, records for which the error has occurred may be extracted from original variable print data to produce second variable print data.

Figure 1:
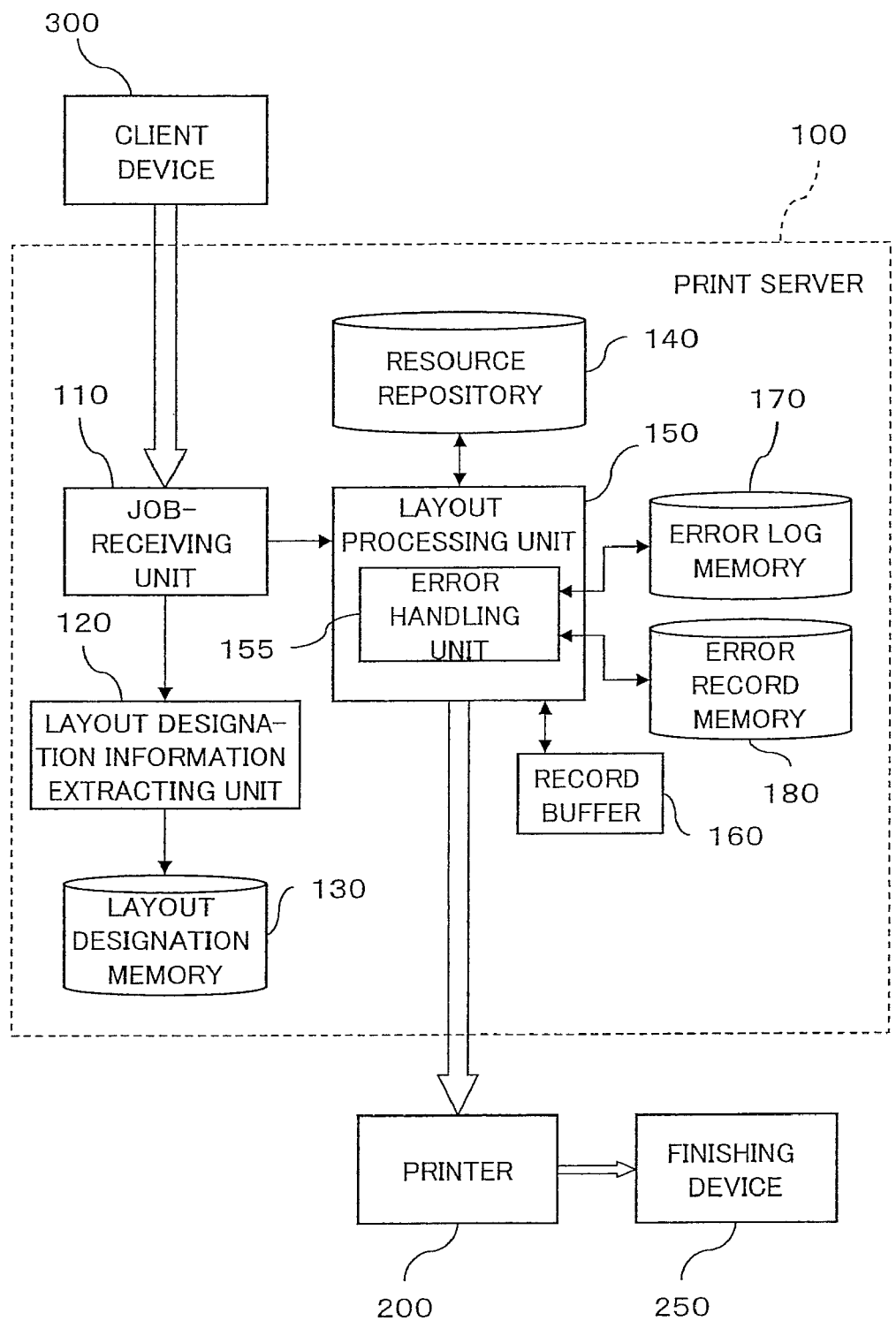
FIG. 1 illustrates a schematic structure of an example of an image-forming system.

With reference to FIG. 1, a structure of an image-forming system according to the exemplary embodiment will be described. This system includes a print server 100 and a printer 200. The printer 200 prints an image on a sheet. The print server 100 converts print data (which may be described in a page description language) input from a client device 300, into image data which can be handled by the printer 200, and provides the image data to the printer 200. In addition, the print server 100 may have a function of controlling the order of execution of print data (also called a "job") input from the client device 300. The print server 100 and the printer 200 may be separate devices connected to each other through a communication channel such as a network, a cable, or the like, or may be constructed in the form of an integrated device. The print server 100 can communicate with the client device 300 through a communication channel such as a network, a cable, or the like.

Here, the print server 100 has a variable data printing function for processing variable print data. The variable print data include information representing one or more records to be printed, and information representing a layout program to be applied to these records. An example of data content of variable print data is shown in FIG. 2. In this example, "(layout01) SETLAYOUT" described on the first line designates a layout program which is to be used in the processing of these variable print data. The identification name of the layout program to be used is "layout01," and "SETLAYOUT" is an instruction to designate a layout program. The second and subsequent lines are data for records to be printed. More specifically, the second line shows field names of respective fields (items) in records to be printed. These example data are for printing direct mail pieces containing image data individualized for each customer, and a record contains a customer's ID, name, and an identifier of image data (for example, a file name). The third and subsequent lines are respective individual records. It should be noted that the substance of image data to be printed is stored in a resource repository 140 (although FIG. 1 shows an example in which the resource repository 140 is provided within the print server 100, the present invention is not limited to this example, and the resource repository 140 may alternatively be present on a network which can be accessed from the print server 100).

The layout program is a program which describes a flow for generating an image for printing based on a record included in the variable print data, and is described in a page description language or another language. The layout program includes a command to generate an image based on one or more field values contained in a record. This type of command renders an image different for each record. Further, the layout program may include a command to render fixed data which do not depend on the records, a command to move a rendering position, or other commands.

FIG. 3 illustrates an example of the layout program. This example illustrates content of the layout program "layout01" designated in the variable print data of FIG. 2. "SETFORM" on the first line is a command to designate a background form image to be used in this layout program. "form01.tif" also on the first line is an identifier (for example, a file name) of a background form image to be used. The second line is a command indicating that the rendering starts from coordinates (72, 144) The third line is a command to render and output ("show") a customer's name (NAME field) as text, associated with a character string such as "Dear Mr/Ms.". The fourth line is a command to render and output an image corresponding to a customer, which is indicated in the IMG field. It should be noted that layout programs and background form images to be used therein are stored in the resource repository 140, each in association with an identifier.

The client device 300 generates variable print data as exemplified in FIG. 2, and transmits them to the print server 100 to request printing. It should be noted that although the above-described example uses a layout program and a background form image existing in the resource repository 140, a layout program or a background form image (or both of them) may be transmitted, together with the variable print data, from the client device 300 to the print server 100. Further, although in the above-described example the records to be printed are contained in the variable print data, instead, it is possible to describe, in the variable print data, information uniquely identifying records present in a database on a network so that, during variable printing, the records can be obtained from the database.

In the print server 100, a job-receiving unit 110 receives a job (in the above-described example, variable print data) from the client device 300. When the job-receiving unit 110 receives variable print data, a layout designation information extraction unit 120 extracts a line for layout designation and a line for field names from the variable print data, and stores them in a layout designation memory 130. In the example shown in FIG. 2, the first and second lines in the variable print data are extracted, and stored in the layout designation memory 130.

The resource repository 140 stores various types of resources to be used in the processing of variable print data. For example, there may be stored one or more layout programs, data for one or more forms (such as background form images), data for one or more images to be used in common for multiple records, other than the forms, or custom fonts.

A layout processing unit 150 processes variable print data to generate image data for printing. More specifically, the layout processing unit 150 executes a layout program for respective records included in the variable print data, and generates image data for each record to supply the generated image data to the printer 200. The layout processing unit 150 may render (overlay) a fixed image or an image varying for each record over a background form image, thereby generating image data corresponding to individual records.

It should be noted that the layout processing unit 150 may be divided into a part for interpreting and executing a layout program (referred to as an interpreting and executing unit) and a part for processing intermediate data (also referred to as a display list) obtained as a result of the interpretation and execution, and rendering a raster image (referred to as a rendering unit). It is also possible to provide a function of operating only the interpreting and executing unit without operating the rendering unit. For example, when an error has occurred, the rendering unit may be suspended, and the interpreting and executing unit may be allowed to continue to interpret and execute a layout program. There are cases where control variables to be used across multiple records, such as serial numbers of the records, are handled in a layout program. In such cases, even when an error has occurred in a certain record, by continuing to interpret and execute the layout program to process such control variables, a subsequent record can be properly processed. Although the rendering unit may be operated under the occurrence of an error, suspending the rendering unit will result in a corresponding reduction in load on the layout processing unit 150.

The image data generated by the layout processing unit 150 are supplied to the printer 200. The printer 200 prints the image data on a sheet. A finishing device 250 may be provided downstream of the printer 200. The finishing device 250 may perform stapling, hole punching, booklet making, or other finishing processes on printed sheets output from the printer 200. Here, the finishing device 250 may be controlled to finish printed sheets in units of records (for example, to make a booklet from each set of printed sheets for one record). The client device 300 may generate job data including variable print data and job control information indicating a finishing process for each record (for example, booklet making), and transmit them to the print server 100. In this case, in accordance with the job control information, the print server 100 may transmit an instruction for the finishing process through the printer 200 or directly to the finishing device 250 every time image data are output as a result of processing of one record (this image data may correspond to multiple pages).

An error handling unit 155 performs a process relating to an error caused because of a record during the image data generation process performed by the layout processing unit 150. More specifically, in the above-described example, when an error has occurred because of a certain record while the layout processing unit 150 is generating image data for the record, the error handling unit 155 stores that record. Then, after the processing for the entire variable print data (job) is completed, stored records may be used to generate variable print data for reprinting these records. The generated data for reprinting are a subset of the original variable print data. Particular details of the process performed by the error handling unit 155 will be described again later.

A record buffer 160 is a buffer memory that temporarily stores records to be processed by the layout processing unit 150. An error log memory 170 stores log information concerning any errors that have occurred in the processing of the layout processing unit 150. The log information may include the date and time of occurrence of an error, an identifier of a job in which the error has occurred, the type of the error, and an identifier of a record in which the error has occurred. An error record memory 180 stores any records in which an error has occurred.

The layout designation memory 130, the record buffer 160, the error log memory 170, and the error record memory 180 may be provided in a RAM (random access memory) of the print server 100.

Figure 4:
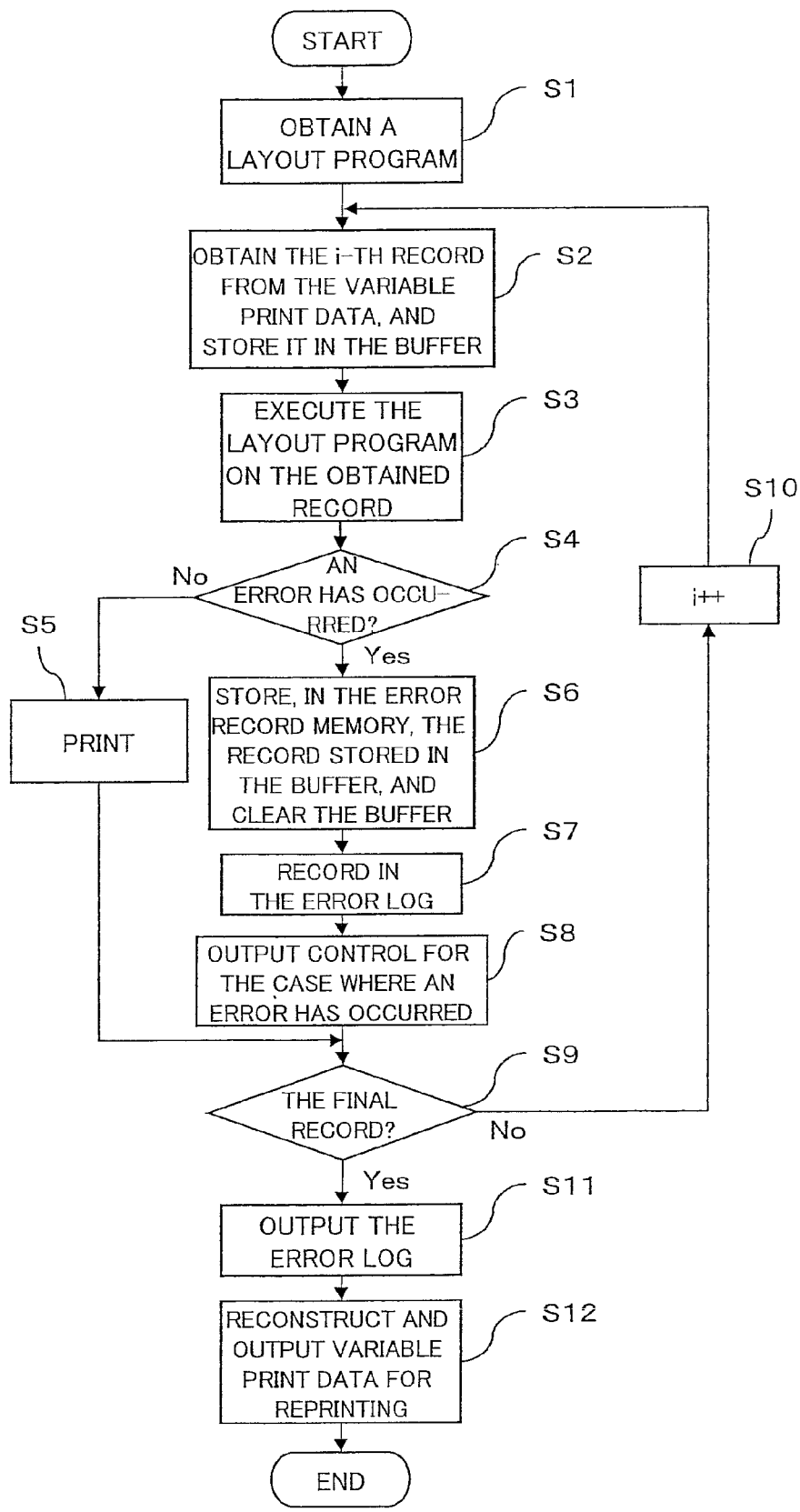
FIG. 4 is a flowchart illustrating an example of a process flow of a layout processing unit and an error handling unit.

Next, an example process flow of the layout processing unit 150 and the error handling unit 155 will be described with reference to FIG. 4. In this flow, first, the layout processing unit 150 extracts layout designation information from variable print data received through the job-receiving unit 110, and obtains, from the resource repository 140, a layout program indicated by the layout designation information (S1). Further, the layout processing unit 150 initializes the error log memory 170, the error record memory 180, various types of control variables such as a variable "i" that represents a number of a record, and the like (the initial value for "i" may be 1). Next, the layout processing unit 150 obtains the i-th record from the variable print data, and stores it in the record buffer 160 (S2). Then, the layout processing unit 150 executes the layout program with regard to the obtained record (S3). The layout processing unit 150 may execute the layout program sequentially from the starting line, and, when the layout program includes a command referring to the record, may execute that command using the obtained record. Then, during the execution, it monitors occurrence of an error caused by that record (S4). When no such error has occurred (the determination at S4 is "No"), the layout processing unit 150 transmits, to the printer 200, image data generated by executing the layout program to cause the printer 200 to print the image data (S5). Here, when the variable print data are accompanied with job control information which indicates a finishing process for each record, the layout processing unit 150 may transmit an instruction through the printer 200 or directly to the finishing device 250 so that the finishing process may be performed for each result obtained by processing one record.

On the other hand, when an error caused by a record has occurred, the error handling unit 155 additionally stores, in the error record memory 180, the current record to be processed which is stored in the record buffer 160, and erases the record stored in the record buffer 160 (S6). Further, the error handling unit 155 generates log information concerning the error, and adds it to the error log memory 170 (S7). Then, the layout processing unit 150 performs output control for the case where an error has occurred (S8).

The output control performed for the case where an error has occurred may be to simply cancel printing for that record. Further, in another example process, an error-indicating image indicating that the current page is an error page may be superimposed on an image generated by the layout processing unit 150 for that record (this generated image includes an influence of the error), and the printer 200 may print a resultant image. Here, as the error-indicating image, a machine-readable image such as a barcode or the like may be used. In this case, the finishing device that performs a finishing process for printed sheets from the printer 200 may recognize the error-indicating image, and may perform a special process for the printed sheets with errors (for example, replacing them with properly printed sheets obtained by reprinting). Further, as another example process of the output control performed for the case where an error has occurred, instead of producing a print for the record, the printer 200 may output a special sheet (insert paper) such as a colored paper or the like in order to indicate the location of the erroneous page. Several examples of the output control performed for the case where an error has occurred have been described above, and the print server 100 has one or more of these control functions. When the print server 100 has more than one of these control functions, an administrator or a user may select one to be used from among these control functions, and set it on the print server 100.

It should be noted that, in the above-described examples, an error caused by a record may occur when an image, a form, or other resources varying for each record cannot be accessed, when data for such resources are corrupted, when the image-forming device does not have data for custom fonts to be used in the processing of the record, when a mandatory field included in the record is empty or has an invalid value, or when the number of fields for the record is incorrect. When an error caused by something other than a record has occurred, the print server 100 may perform error handling similar to that conventionally employed.

After, as described above, the process of step S5 or steps S6 through S8 is completed, the layout processing unit 150 determines whether or not the record processed in step S3 is the final record of the variable print data (S9). If not the final, the record number "i" is incremented by one (S10), and the processing of steps S2 through S8 is repeated. Therefore, even when an error has occurred in a certain record, the process continues to process a subsequent record.

When it is determined at step S9 that the record is the final record, the error handling unit 155 performs a process to output the error log stored in the error log memory 170 (S11). The error log may be output by producing printed output from the printer 200, or by writing it in a file. An example of data content of an error log is shown in FIG. 5. In this example, the error log is described in a markup language such as XML (extensible Markup Language). In this example, the error log for one piece of variable print data (one job) is one element starting from a start tag <print_log> and ending with an end tag </print_log>. In the start tag <print_log>, a job name (such as a file name of variable print data), a job ID, the date and time of execution of the job, and the like are shown as attributes. The <print_log> element includes an <errors> element. The <errors> element shows errors that have occurred in that job, and, as shown, an <error> element representing log information of an individual error is listed in the <errors> element. In each <error> element, an ID identifying an error, an identification number of a record in which an error has occurred ("rec_number"), an error code representing the type of error, and the like are included as attributes. Further, the <error> element includes an explanation indicating error content as character string information. It should be noted that the example shows a log for the case where the image "002.tif" for the second record of the variable print data shown in FIG. 2 could not be read because it is corrupted or for any other reason. When multiple errors have occurred in a job, an <error> element is generated for each error, and is added into the <errors> element. It should be noted that the example in FIG. 5 shows a log which may contain log information relating to not only an error but also various types of events that have occurred in the processing of a job. A log of something other than an error is incorporated into the <print_log> element as an element parallel to the <errors> element.

Further, the error handling unit 155 combines records stored in the error record memory 180 with information for layout designation and field names of the records stored in the layout designation memory 130 to thereby generate and output variable print data for use in reprinting after recovery from the error (S12). An example of variable print data for reprinting is shown in FIG. 6. This example is an example for the case where, during the processing of the variable print data shown in FIG. 2, an error occurs for the second record, and the processing for the other records is completed in a normal manner. The error log and the variable print data for reprinting may be returned, as a result of the processing, to the client device 300 that requested the job. After generation of the variable print data for reprinting is completed, the information stored in the layout designation memory 130 is deleted.

By referring to the output error log, a user can know the details of the error, and can take steps to resolve the error. For example, when image data designated in a record are corrupted, the image file may be recovered. Further, when image data designated in a record are an image of a format which cannot be printed by the printer (for example, when an image which requires six colors of ink is to be printed by a printer which uses four colors of ink), an image having a format printable by the printer may be newly prepared. Further, when image data designated in a record are not in the resource repository 140, the image data may be registered in the resource repository 140, or identification information of the image data designated in the record may be corrected to proper information. When custom fonts necessary for printing a record are unavailable, measures may be taken by adding the custom fonts to the resource repository 140, or by changing designation of fonts to be used for the record. Further, when a field included in a record does not have a value, or has an invalid value, the value for the field may be supplemented or corrected. During such error handling processes, the user can make corrections, as needed, to the variable print data for reprinting generated by the error handling unit 155.

Then, after such an error handling process is completed, when the user instructs the print server 100 to process the variable print data for reprinting, the print server 100 processes the variable print data in the flow similar to that described above. If all causes of any errors are resolved, all records included in the variable print data will be properly printed.

Figure 7:
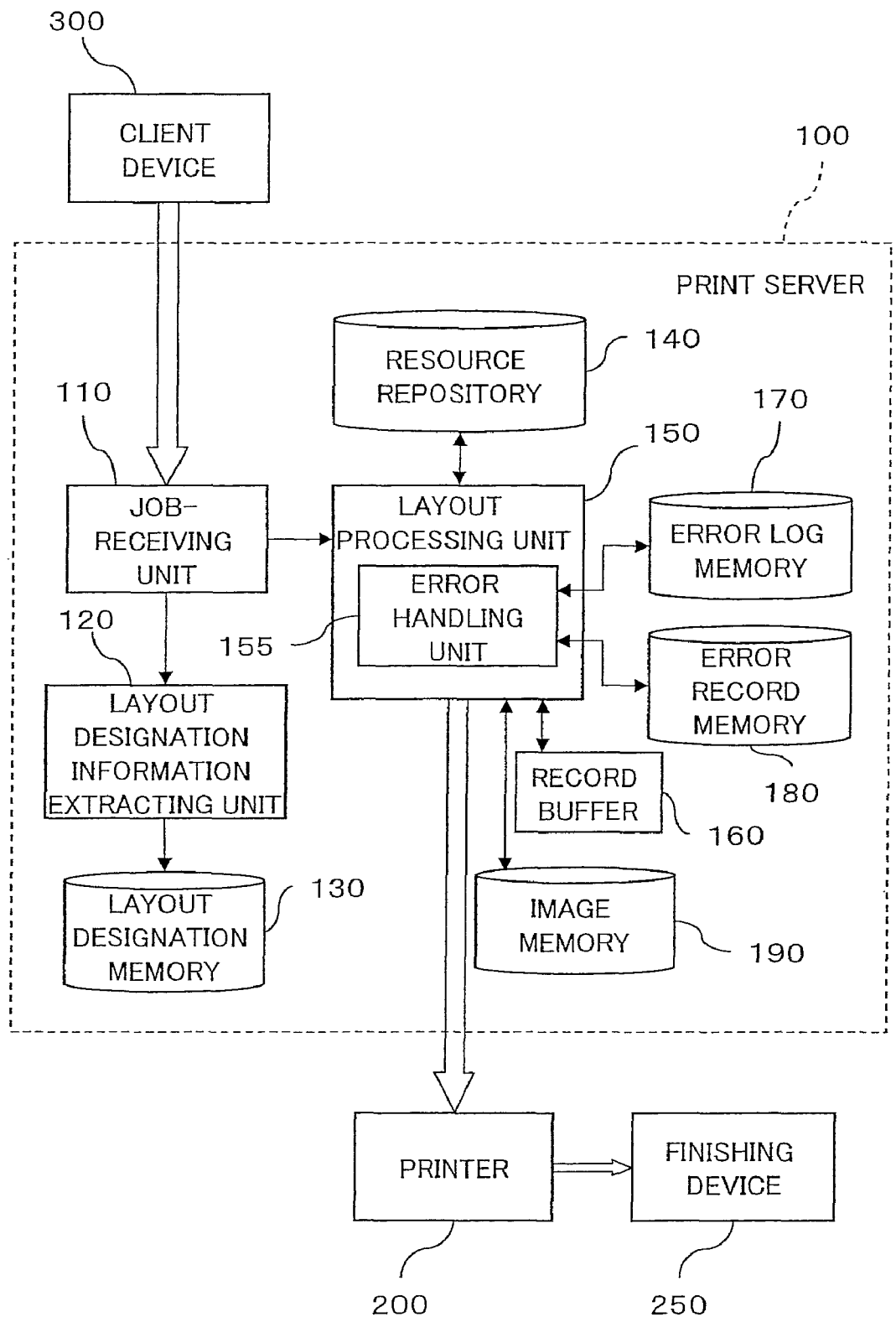
FIG. 7 illustrates a schematic structure of an image-forming system according to a modification example.

Next, there will be described a modification example in which multiple pages of images are generated and printed for a single record. Examples in which multiple pages are generated for a single record may include an example in which, in the printing of the records exemplified in FIG. 2, a name of a customer indicated in the second field is printed on a first page, and an image indicated in the third field is printed on the next page. FIG. 7 illustrates an example of a system which includes a print server 100 for this modification example. In FIG. 7, the print server 100 of this modification example includes an image memory 190, in addition to the structural elements that the print server 100 shown in FIG. 1 includes. The image memory 190 is a device for temporarily storing image data for each page generated by the layout processing unit 150 until the printing starts. The image memory 190 may be constructed from hardware such as a RAM or a hard disk drive. It should be noted that image data to be stored in the image memory 190 may be raster image data or intermediate data.

Figure 8:
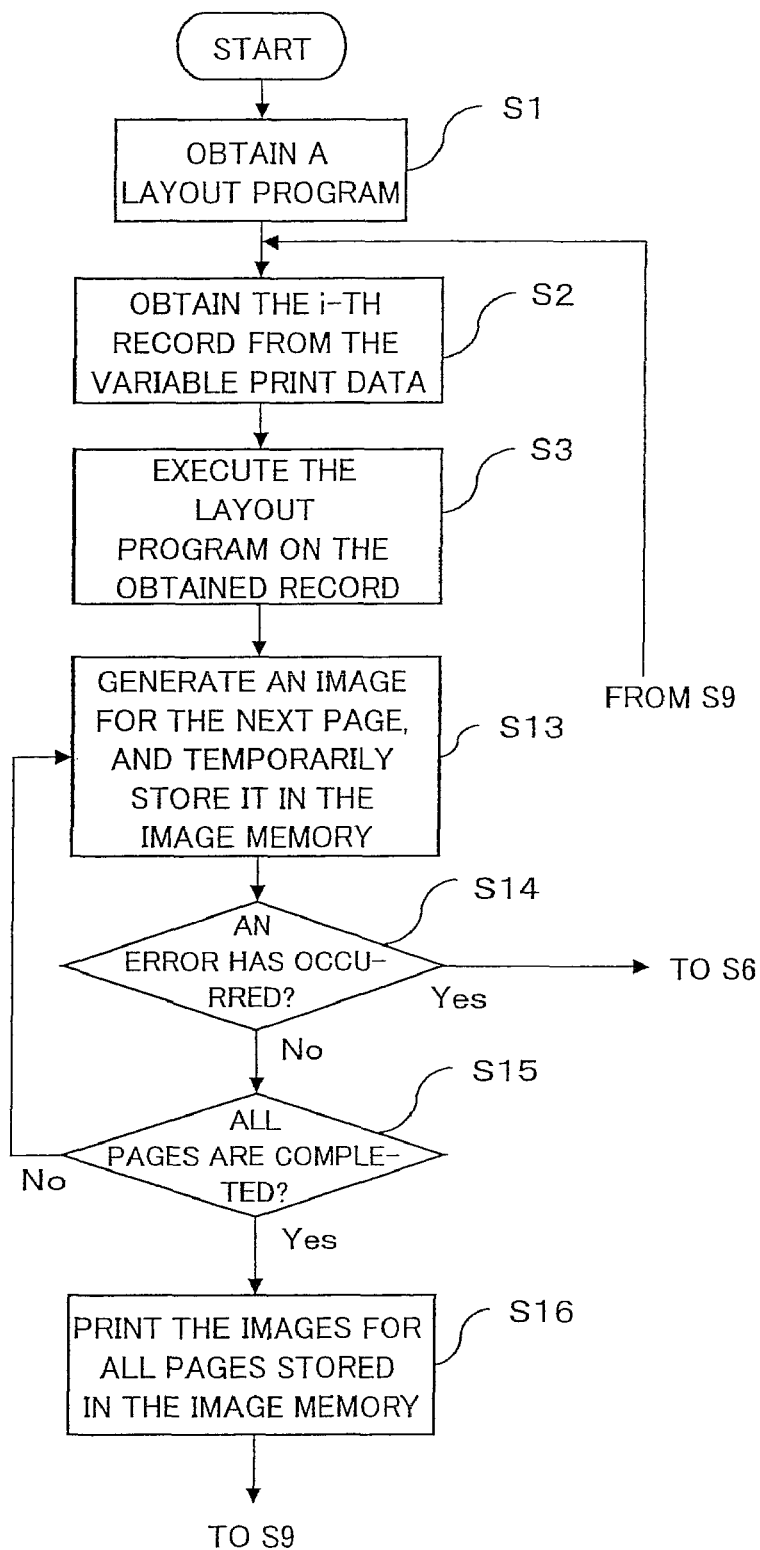
FIG. 8 is a flowchart illustrating an example of a process flow of a layout processing unit and an error handling unit according to a first modification example.

A process flow of the layout processing unit 150 and the error handling unit 155 according to this modification example will be described with reference to FIG. 8 (and FIG. 4). Respective steps shown in FIG. 8 that are similar to those shown in FIG. 4 are denoted by the same reference numerals, and their explanations are not repeated. In this flow, while a layout program is executed on a record sequentially from the starting line (S3), multiple pages of images corresponding to the record are sequentially generated. In such execution of a layout program, when one page of image data is generated, the layout processing unit 150 temporarily stores the image in the image memory 190 in a manner such that the order of pages can be identified (S13). During the generation of the image for this page, the error handling unit 155 monitors whether an error caused by the record is occurring (S14). Here, when occurrence of an error is detected, processing proceeds to step S6 (see FIG. 4). On the other hand, when occurrence of an error is not detected, the layout processing unit 150 determines whether generation of image data for all pages corresponding to the record is completed (S15). When the layout program is executed until the ending line is reached, it may be determined that generation of image data for all pages has been completed. When generation of image data for all pages is not completed, processing returns to step S13 and continues to execute the layout program to generate image data for the next page. Through repetition of steps S13 through S15, image data for all pages corresponding to the record are generated and stored in the image memory 190, and then the layout processing unit 150 transmits, to the printer 200, the image data for these respective pages stored in the image memory 190 to cause the printer 200 to print the image data (S16). Subsequently, the layout processing unit 150 deletes the images for the respective pages stored in the image memory 190, and proceeds to step S9 (see FIG. 4). It should be noted that, when a finishing process is specified for each record, in addition to providing an instruction to print image data for all pages corresponding to the record in step S16, the layout processing unit 150 may provide an instruction to perform a finishing process for printed sheets for all these pages.

In this process flow, only after generation of image data for all pages corresponding to one record is completed in a normal manner, the image data for these pages are collectively printed. Conversely, if an error occurs in even only one of the pages corresponding to one record, none of the pages corresponding to the record will be printed. The remaining steps may be similar to those in the flow of FIG. 4.

Next, a second modification example in which multiple logical pages are printed on a single sheet, such as in double-sided printing or so-called n-up printing, will be described. It should be noted that the n-up printing is a process to arrange and print multiple logical pages on a single physical page (in other words, on one side of a sheet).

Figure 9:
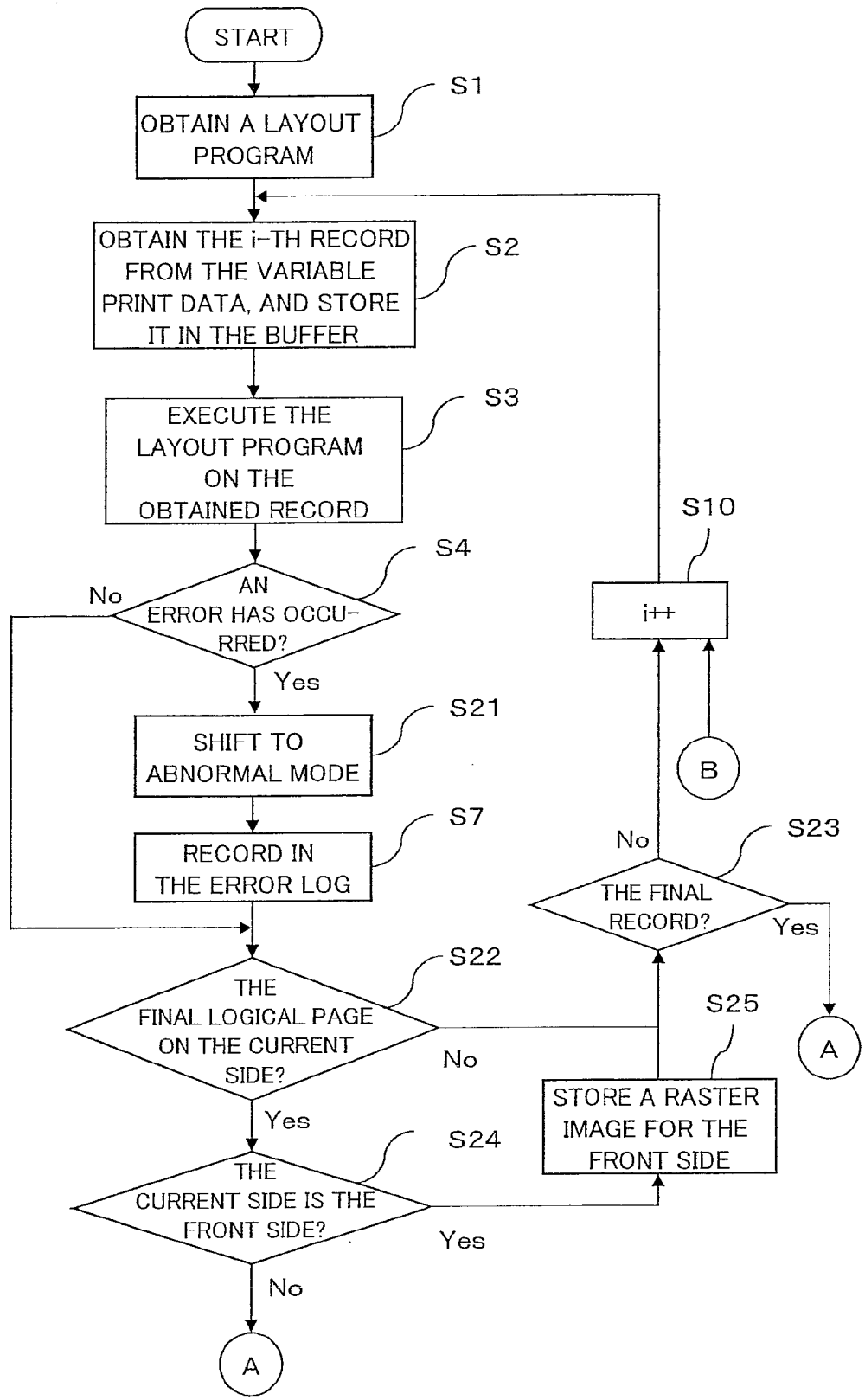
FIG. 9 is a flowchart illustrating a part of an example of a process flow of a layout processing unit and an error handling unit according to a second modification example.
Figure 10:
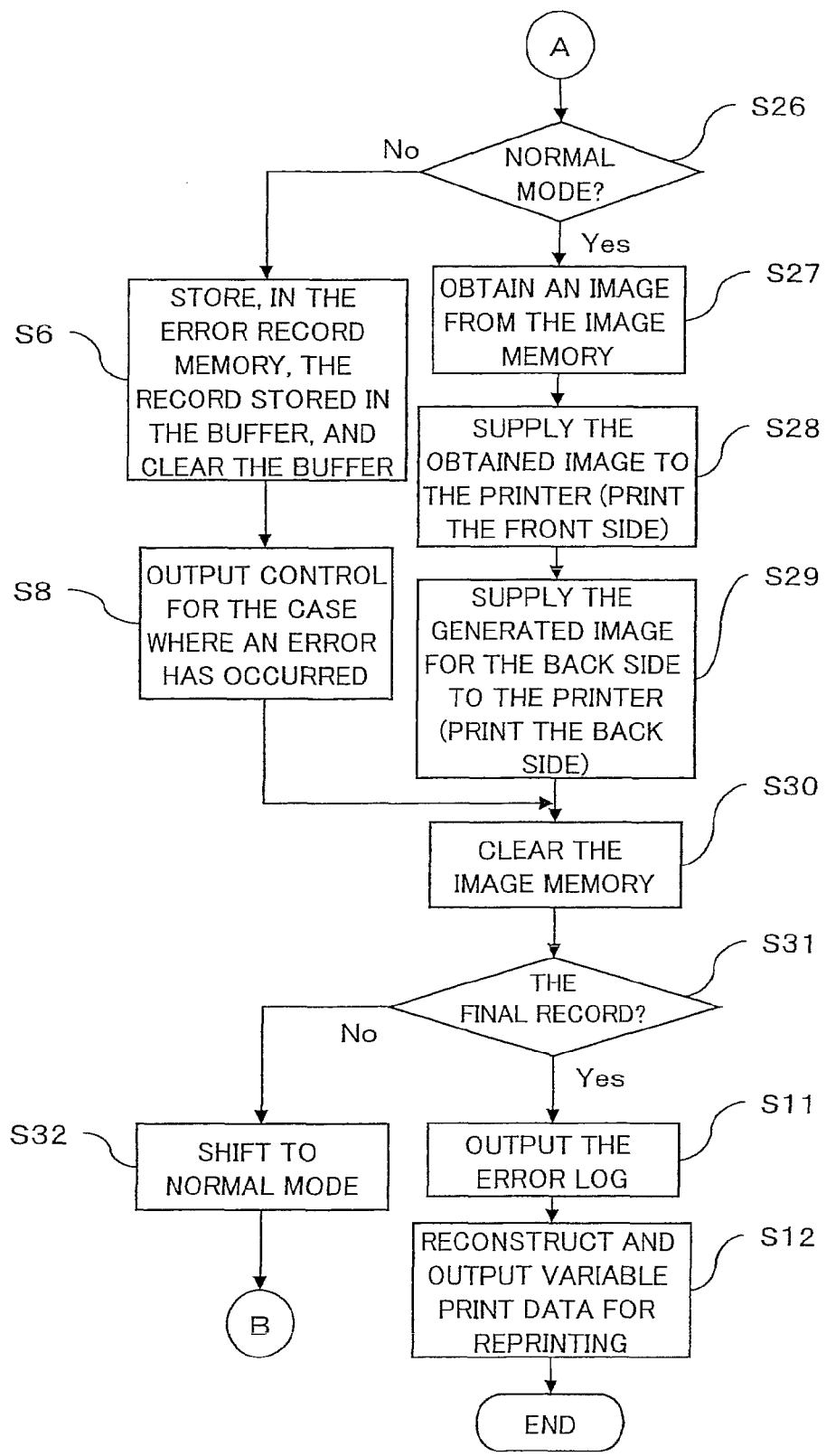
FIG. 10 is a flowchart illustrating the remaining part of the example of the process flow of the layout processing unit and the error handling unit according to the second modification example.

A structure of the print server 100 for this second modification example may be similar to that of the first modification example illustrated in FIG. 7. However, the process flow of the layout processing unit 150 and the error handling unit 155 differs from that of the first modification example. FIGS. 9 and 10 illustrate the process flow of this second modification example. In FIGS. 9 and 10, steps similar to the steps shown in the flow of FIG. 4 are denoted by the same reference numerals, and their explanations are not repeated.

This process flow should be easily understood by assuming a typical case in which an image for one page (logical page) is generated for one record in step S3.

In this process flow, the layout processing unit 150 has two exclusive operation modes; that is, a normal mode and an abnormal mode. At the time when processing of variable print data is started, the layout processing unit 150 is set to the normal mode. Then, while a layout program is being executed on a certain record (S3), when an error caused by that record has occurred, the layout processing unit 150 shifts to the abnormal mode (S21), and the error handling unit 155 registers log information concerning that error in the error log memory 170 (S7). At this point in time, the record in which an error has occurred is not yet stored. Once processing shifts to the abnormal mode, regardless of whether or not there is an error in a subsequent record, processing will not return to the normal mode until it proceeds to an image generation process for the next sheet. It should be noted that, when no error has occurred, processing skips steps S21 and S7.

Next, the layout processing unit 150 determines whether or not the image data produced from the record in the processing at step S3 correspond to the final logical page on a current sheet side to be printed (S22). For example, in two-up printing (in a mode of arranging and printing two logical pages on one side of a sheet), at a stage in which an image for the first page on one side has been generated, the determination here is "No" (negative). It should be noted that, during execution of a layout program to generate images, the layout processing unit 150 manages whether the currently generated image is for the front or back side of the sheet, and in n-up printing, manages what number-th logical page on the sheet side the currently generated image is for, and therefore may use this information. When the determination at step S22 is "No," whether or not the record is the final record of the variable print data is determined (S23), and if not the final, after the record number "i" is incremented by one (S10), processing returns to step S2 to process the next record. If it is the final, the layout processing unit 150 proceeds to step S26 in the flow of FIG. 10 to perform image printing or error handling.

The above-described steps S2 through S23 are repeated until images for all logical pages to be printed on one side are generated, or until the final record is reached. It should be noted that, in the abnormal mode, in step S3, the rendering unit in the layout processing unit 150 may be suspended, and only the interpreting and executing unit may be allowed to operate.

Further, when the determination at step S22 is "Yes" (positive), this means that images for one side of the sheet have been completed. In this case, the layout processing unit 150 determines whether or not that side is the "front" side of the sheet (S24). As this example performs double-sided printing, when the current side is the front side, the image data for that completed front side are temporarily stored in the image memory 190 (S25), and processing proceeds to step S23.

When the side for which images have been completed is the "back" side, as this means that image generation for both front and back sides has been completed, the layout processing unit 150 proceeds to step S26 in the flow of FIG. 10 to perform image printing or error handling.

In step S26 in FIG. 10, the layout processing unit 150 determines whether or not the current mode is the normal mode. If it is the normal mode, as this means that no error has occurred in the image generation for both front and back sides, the images for the front and back sides are passed to the printer 200 to cause the printer 200 to print the images. In other words, when no error has occurred, the layout processing unit 150 permits output of the images for the front and back sides stored in the image memory 190. More specifically, the image for the front side is retrieved from the image memory 190 (S27), that image is supplied to the printer 200 to cause the printer 200 to print the front side (S28), and then the currently generated image for the back side is supplied to the printer 200 to cause the printer 200 to print the back side (S29). It should be noted that, when the final record is reached during generation of an image for the front side (the determination in S23 is "Yes"), the image memory 190 does not have an image for the front side. In this case, in steps S27 through S29, the image for the front side generated at that time is simply transmitted to the printer 200 to cause the printer 200 to print the image.

On the other hand, when it is determined in step S26 that the current mode is the abnormal mode, the error handling unit 155 stores, in the error record memory 180, records stored in the record buffer 160, and clears the record buffer 160 (S6). Because, at the time when step S6 is started, the record buffer 160 stores therein all records to be printed on front and back sides of a sheet, these records are collectively stored in the error record memory 180 in step S6. Subsequently, as in the flow of FIG. 4, output control for the case where an error has occurred (S8) is performed. In particular, it is possible to cancel printing of the entire sheet which includes a record in which an error has occurred. In other words, as described above, when an error has occurred, the layout processing unit 150 may disable output of the images for the front and back sides stored in the image memory 190. Further, instead of printing the images whose output is canceled, the printer 200 may be controlled so as to insert an insert paper.

After step S29 or S8, the layout processing unit 150 erases the front side image stored in the image memory 190 (S30). Then, a determination is made as to whether or not the current record is the final one in the variable print data (S31), and if not the final, the mode shifts to the normal mode (S32), the record number "i" is incremented by one (S10), and processing returns to step S2 to process the next record. If the current record is the final one, as in the flow of FIG. 4, the error log is output (S11), and the records stored in the error record memory 180 are used to produce and output variable print data for reprinting (S12). The output variable print data for reprinting include not only a record in which an error has occurred, but also all records to be printed on the same sheet as that record.

It should be noted that, even if a layout program generates multiple logical pages from one record, the flow shown in FIGS. 9 and 10 can be used in cases where the number of logical pages to be generated from one record is not greater than the number of logical pages to be printed on one side of a sheet, and logical pages generated from a predetermined number of consecutive records completely fill both sides of a single sheet. As an example of such cases, there is a case in which two logical pages per record are generated in, for example, two-up and double-sided printing. Further, in order to be also applicable to more general cases not limited to such a relationship, the flow of FIGS. 9 and 10 may incorporate an extension similar to the flow of the first modification example illustrated in FIG. 8.

Further, the process flow shown in FIGS. 9 and 10 is applicable to a case where both double-sided printing and n-up printing are designated simultaneously. For the case where single-sided, n-up printing is designated, the flow omits steps S24 and S25 from the flow of FIGS. 9 and 10.

An exemplary embodiment and several modification examples have been described above. In the above-described examples, an error record memory 180 is prepared, a record in which an error has occurred during execution of a job is stored in the memory 180 in real time, and after the job is completed, variable print data for reprinting are generated from records stored in the memory 180. However, these are only an illustration. Instead of the above, it is possible to, during execution of a job, only record an error log without storing records, and after the job is completed, the error handling unit 155 may generate variable print data for reprinting based on the original variable print data and the error log. In this case, the error handling unit 155 may identify, based on information in the error log, records in which an error has occurred to extract these identified records, the layout designation, and the field name information from the original variable print data to generate variable print data for reprinting.

Next, a print server as a reference example will be described with reference to FIGS. 11 and 12. According to this reference example, even if an error caused by a record has occurred in the processing of variable print data, the print server 100 is not suspended and continues to print the subsequent record. Further, an image of a record in which an error has occurred is printed with an error mark indicating the inclusion of an error being superimposed (overlaid) thereon.

Figure 11:
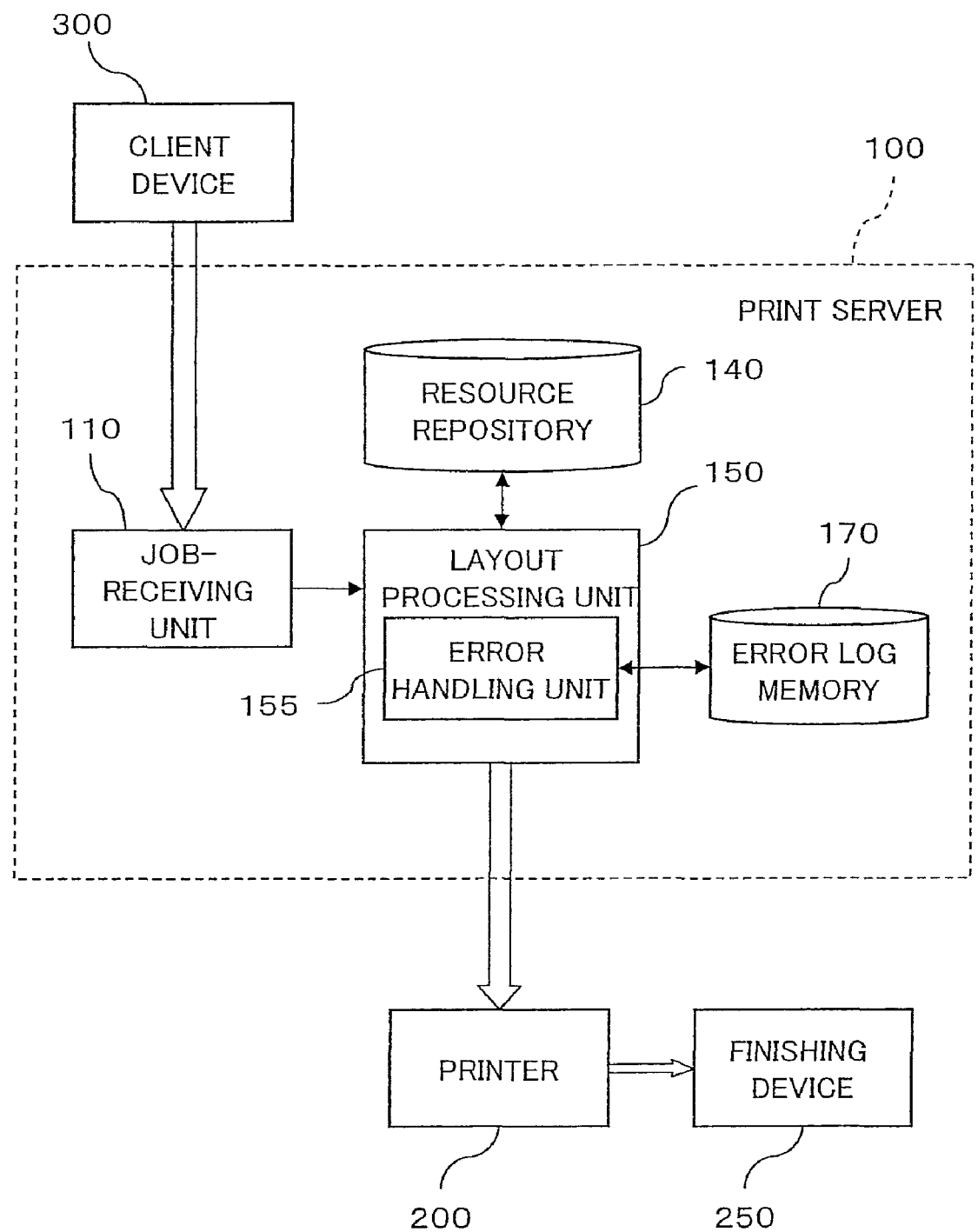
FIG. 11 illustrates a schematic structure of an image-forming system according to a reference example.
Figure 12:
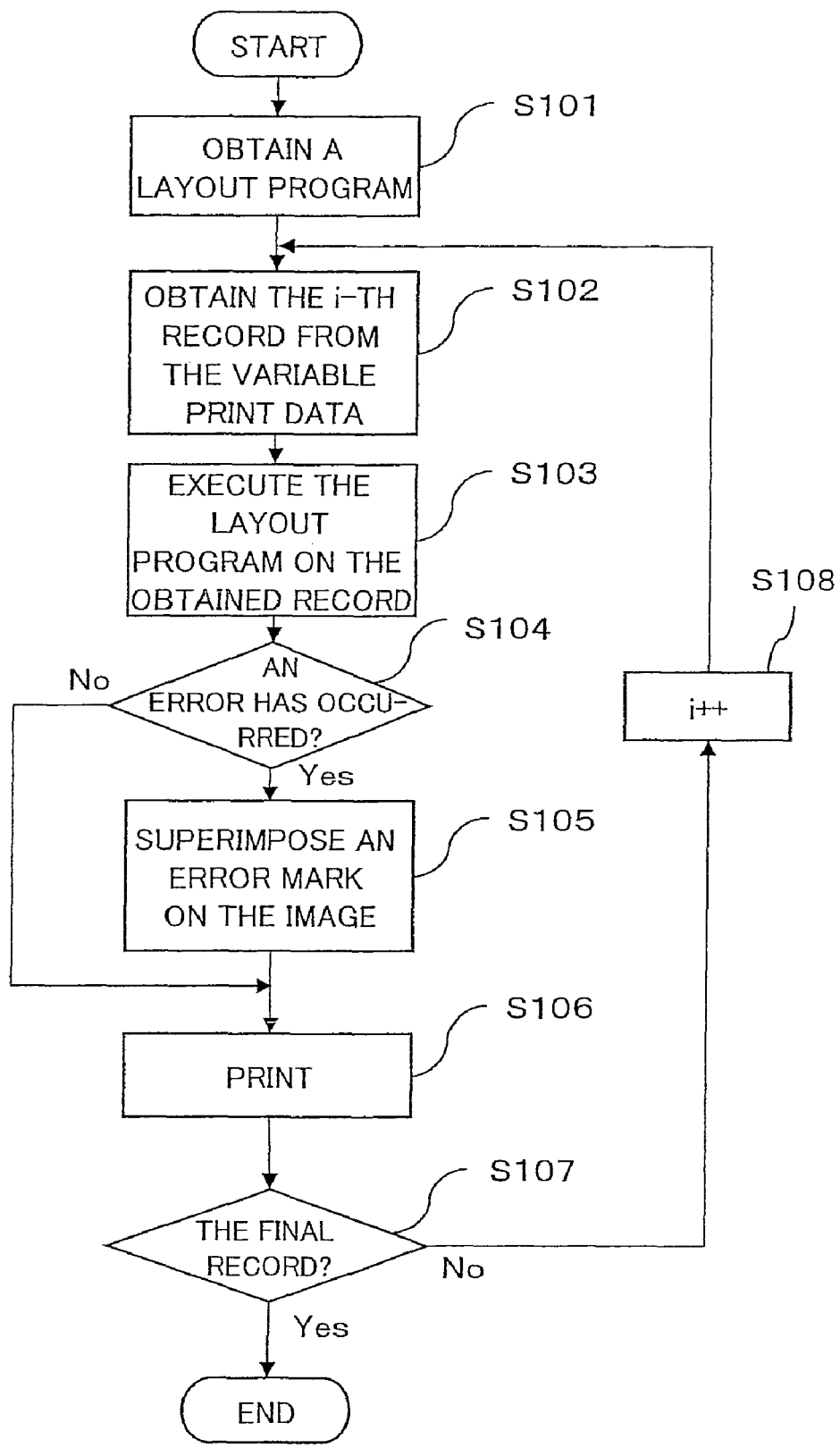
FIG. 12 is a flowchart illustrating an example of a process flow of a layout processing unit and an error handling unit according to the reference example.

FIG. 11 illustrates a system structure of this reference example. The structure shown in FIG. 11 omits, from the structure shown in FIG. 1, the layout designation information extracting unit 120, the layout designation memory 130, the record buffer 160, and the error record memory 180, and in which an error handling unit 155 performs a process different from that of the error handling unit 155 of FIG. 1. An example of a process flow of the layout processing unit 150 including the error handling unit 155 is shown in FIG. 12.

In this flow, first, the layout processing unit 150 extracts layout designation information from variable print data received through the job-receiving unit 110, and obtains, from the resource repository 140, a layout program indicated by the layout designation information (S101). Further, the layout processing unit 150 initializes the error log memory 170, various types of control variables such as a variable "i" that represents a number of a record, and the like (the initial value for "i" may be 1). Next, the layout processing unit 150 obtains the i-th record from the variable print data (S102), and executes the layout program on the obtained record (S103).

Then, during the execution, it monitors occurrence of an error caused by that record (S104). When such an error has occurred, the error handling unit 155 superimposes an error mark on an image corresponding to the record generated in step S103 (S105), and causes the printer 200 to print the image obtained after the superimposition (S106). Here, as the error mark to be superimposed, a barcode or other machine-readable mark may be used so that the finishing device 250 can recognize an error mark from the printed sheets output from the printer 200, and can automatically distinguish between normal printed sheets and erroneous printed sheets. When no error has occurred, the layout processing unit 150 causes the printer 200 to print the image generated in step S103 in that form (S106). After the process of step S106 is completed, the layout processing unit 150 determines whether or not the record processed in step S103 is the final record of the variable print data (S107). If not the final, the record number "i" is incremented by one (S108), and the processing of steps S102 through S107 is repeated.

Figure 13:
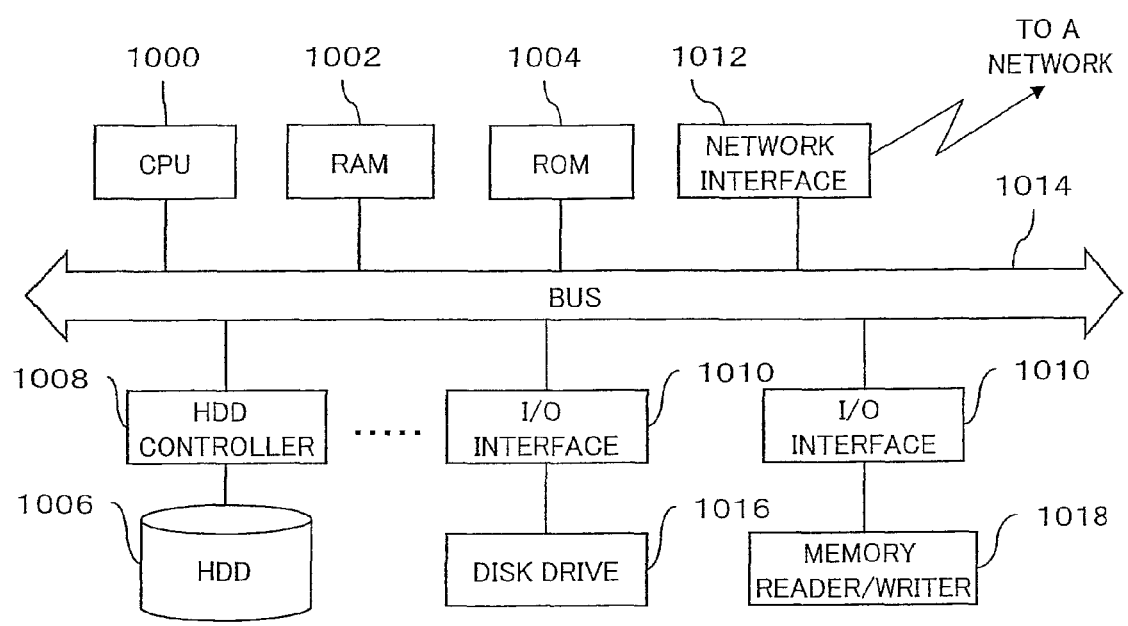
FIG. 13 illustrates an example of a hardware structure of a computer.

The above-exemplified print server 100 may be implemented by causing a general-purpose computer to execute a program representing the processing for the above-described respective functional modules. Here, the computer may be in the form of hardware having a circuit structure in which, as shown in FIG. 13, a microprocessor such as a CPU 1000, a memory (primary storage) such as a random access memory (RAM) 1002 and a read-only memory (ROM) 1004, an HDD controller 1008 that controls an HDD (hard disk drive) 1006, various types of I/O (input/output) interfaces 1010, a network interface 1012 that performs control for connection to a network such as a local area network, and the like are connected through, for example, a bus 1014. Further, a disk drive 1016 for reading from and/or writing to a portable disk recording medium such as a CD or DVD, a memory reader/writer 1018 for reading from and/or writing to a portable nonvolatile recording medium of various types of standards such as a flash memory, and the like may be connected to the bus 1014 through, for example, an I/O interface 1010. Through a recording medium such as a CD or DVD, or through communication means such as a network, a program in which is described the processing to be performed by the above-exemplified respective functional modules is stored in a fixed storage device such as a hard disk drive, and installed on the computer. The program stored in the fixed storage device is read by the RAM 1002 and executed by a microprocessor such as the CPU 1000, thereby implementing the above-exemplified functional modules. It should be noted that a part or all of these functional modules may be constructed as a hardware circuit such as special-purpose LSI (Large Scale Integration), ASIC (Application Specific Integrated Circuit), or FPGA (Field Programmable Gate Array).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image-processing device, comprising:
   a receiving unit that receives first variable print data including a plurality of records and designation information designating a rendering program to be executed in an image generation process with regard to the first variable print data;
   an image generation unit that performs the image generation process in which the rendering program is executed with regard to the plurality of records included in the first variable print data to generate output images corresponding to each of the plurality of records, wherein when an error occurs because of a first record of the plurality of records during generation of an output image corresponding to the first record, the image generation unit continues the image generation process by changing a record to be processed from the first record to a record which is to be processed later than the first record; and
   a variable print data generation unit that generates second variable print data including the first record and the designation information.

2. The image-processing device according to claim 1, the image generation unit comprising:
   a storage unit that stores one or more generated output images; and
   a controller that, if no error occurs, performs control to permit output of an output image stored in the storage unit.

3. The image-processing device according to claim 1, the image generation unit comprising:
   a storage unit that stores generated output images until generation of all output images corresponding to at least one record is completed; and
   a controller that, if the error occurs, performs control to disable output of stored output images corresponding to the first record.

4. The image-processing device according to claim 1, wherein, when an output image corresponding to the first record is also corresponding to a second record, the variable print data generation unit generates the second variable print data including the second record in addition to the first record.

5. The image-processing device according to claim 1, wherein when the error occurs, the image generation unit changes the record to be processed to a record corresponding to an output image which is to be generated next to the output image corresponding to the first record.

6. The image-processing device according to claim 1, the image generation unit comprising:
   a storage unit that stores one or more output images generated by the image generation unit;
   a print controller that performs control to cause a printer to perform a printing process to print a plurality of logical pages on a single sheet using the output images stored in the storage unit; and
   a controller that, if an error occurs in the image generation unit in connection with any record to be printed on a first single sheet, controls to disable printing of stored output image to be printed on the first sheet, and controls to cause the image generation unit to continue the image generation process by changing the record to be processed to a record to be printed on a sheet next to the first sheet.

7. A computer-readable medium storing a program causing a computer to execute a process for controlling variable printing, the process comprising:
   receiving first variable print data including a plurality of records and designation information designating a rendering program to be executed in an image generation process with regard to the first variable print data;
   performing the image generation process in which the rendering program is executed with regard to the plurality of records included in the first variable print data to generate output images corresponding to each of the plurality of records;
   when an error occurs because of a first record of the plurality of records during generation of an output image corresponding to the first record, continuing the image generation process by changing a record to be processed from the first record to a record which is to be processed later than the first record; and
   generating second variable print data by combining the first record and the designation information.

8. An image-processing method comprising:
   receiving first variable print data including a plurality of records and designation information designating a rendering program to be executed in an image generation process with regard to the first variable print data;
   performing the image generation process in which the rendering program is executed with regard to the plurality of records included in the first variable print data to generate output images corresponding to each of the plurality of records;
   when an error occurs because of a first record of the plurality of records during generation of an output image corresponding to the first record, continuing the image generation process by changing a record to be processed from the first record to a record which is to be processed later than the first record; and
   generating second variable print data by combining the first record and the designation information.

* * * * *